July 27, 1943.  S. J. GEDRIS  2,325,501
MOLDING MACHINE
Filed Jan. 30, 1942  5 Sheets-Sheet 1
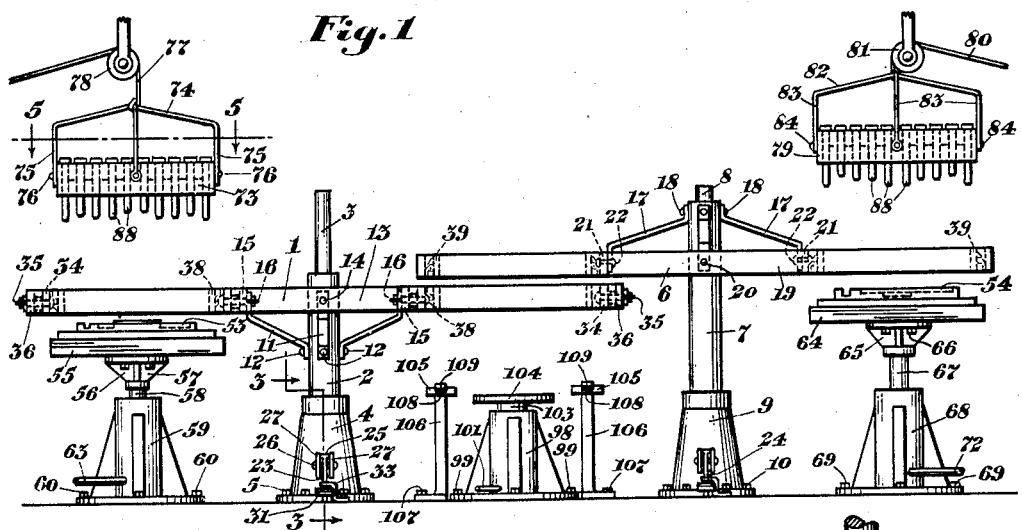
Inventor
Stanley J. Gedris
By John S. Braddock
Attorney July 27, 1943.    S. J. GEDRIS    2,325,501
MOLDING MACHINE
Filed Jan. 30, 1942    5 Sheets-Sheet 2
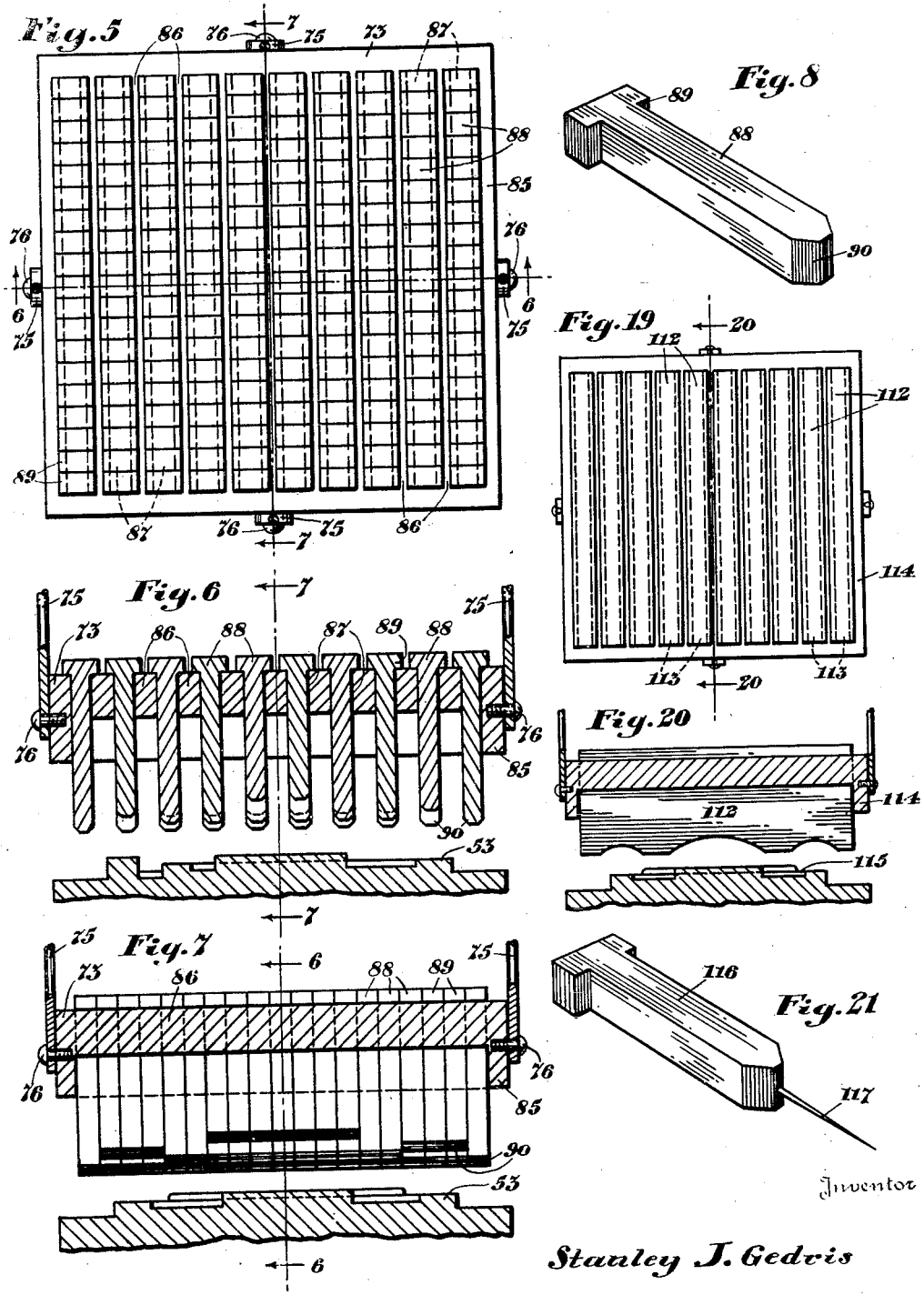
Inventor
Stanley J. Gedris
By John S. Brassock
Attorney July 27, 1943.  S. J. GEDRIS  2,325,501
MOLDING MACHINE
Filed Jan. 30, 1942    5 Sheets-Sheet 3
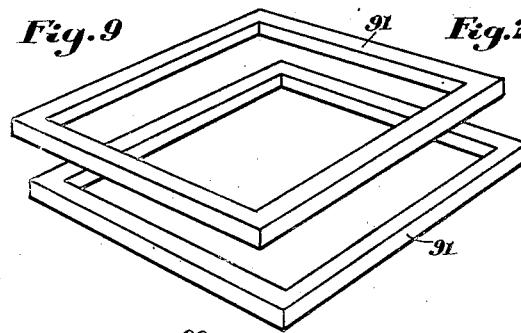
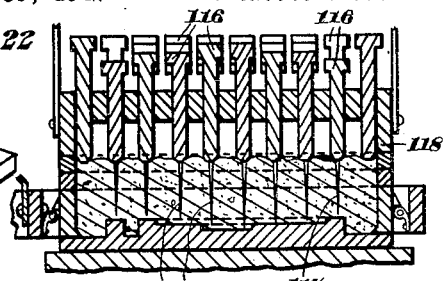
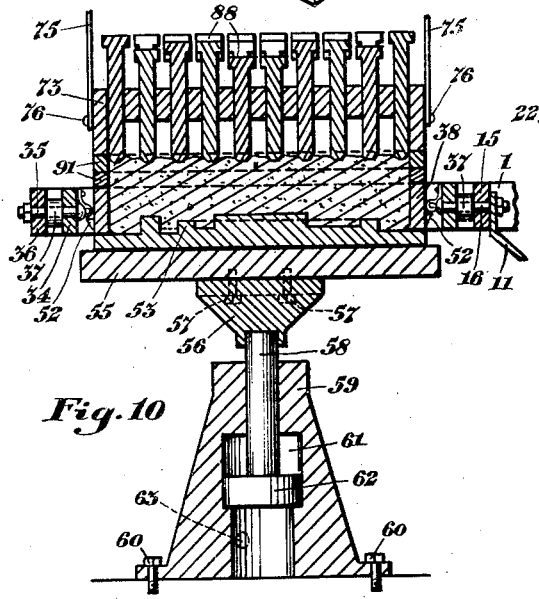
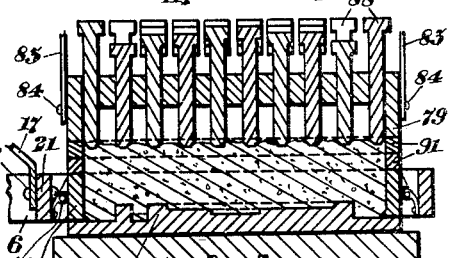
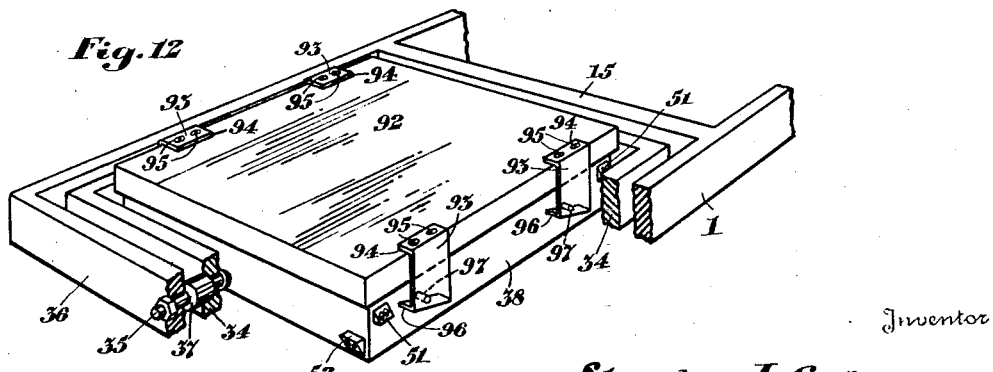
Inventor
Stanley J. Gedris
By John S. Bradden
Attorney July 27, 1943. S. J. GEDRIS 2,325,501
MOLDING MACHINE
Filed Jan. 30, 1942 5 Sheets-Sheet 4
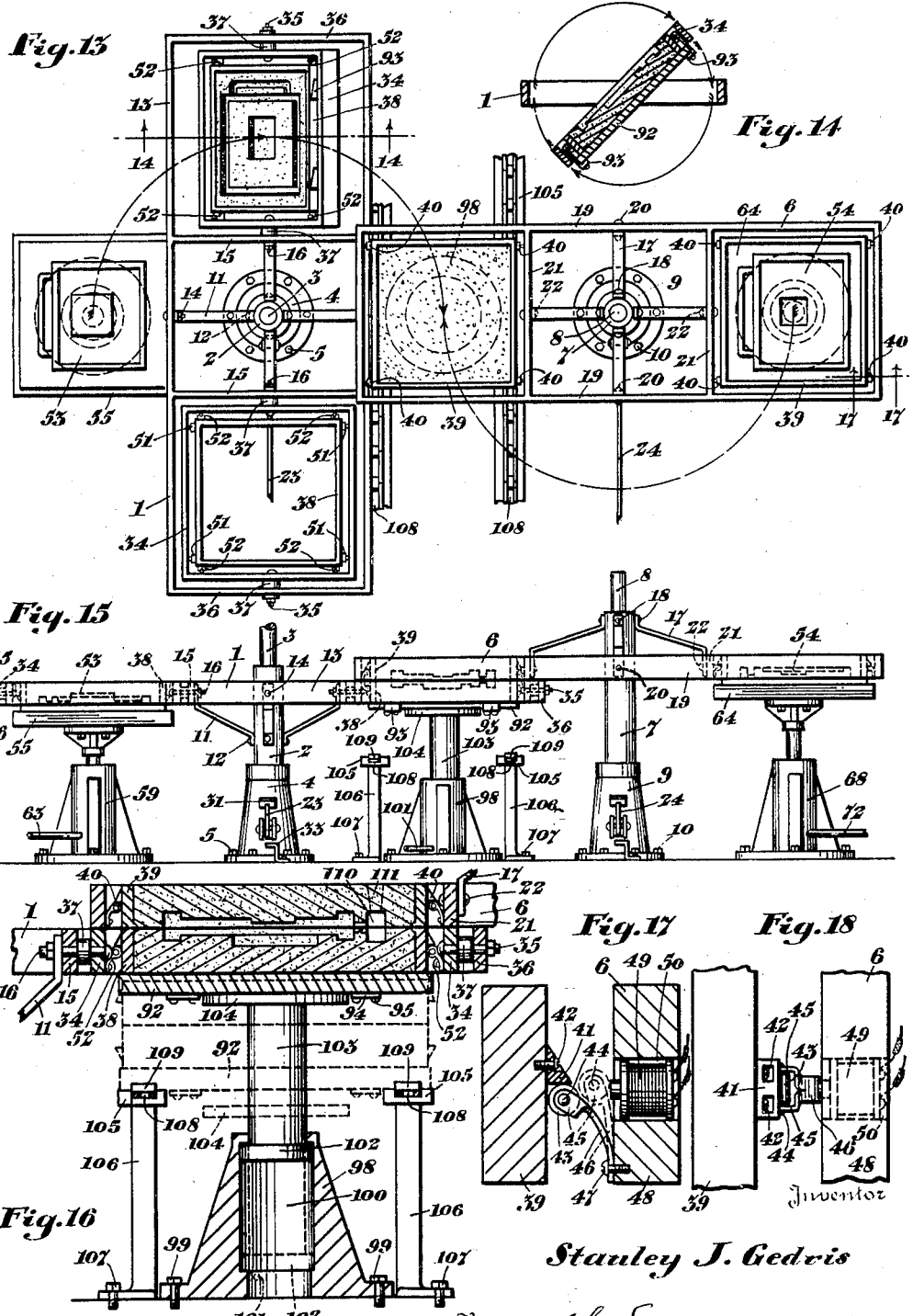

July 27, 1943.  S. J. GEDRIS  2,325,501
MOLDING MACHINE
Filed Jan. 30, 1942  5 Sheets-Sheet 5
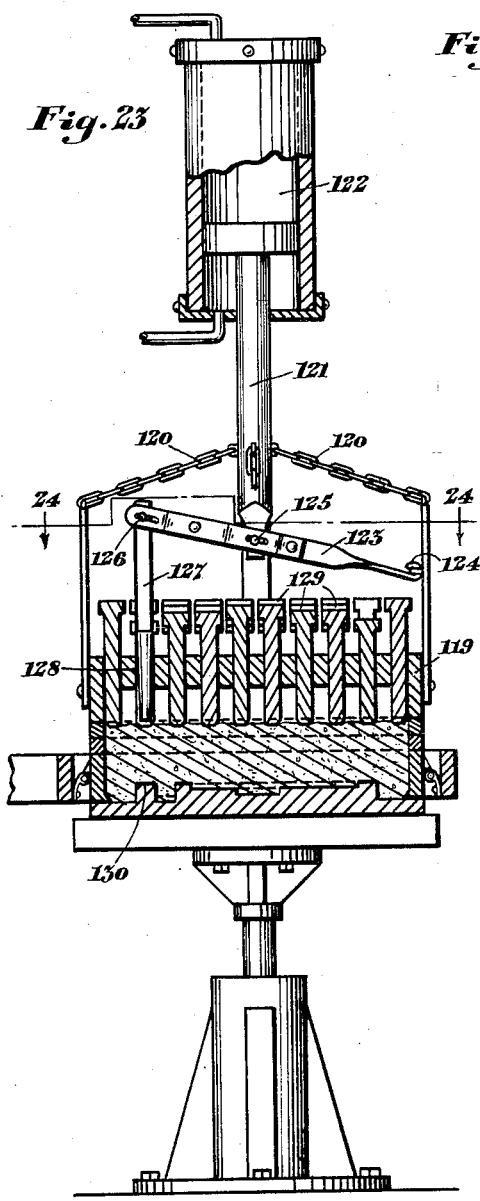
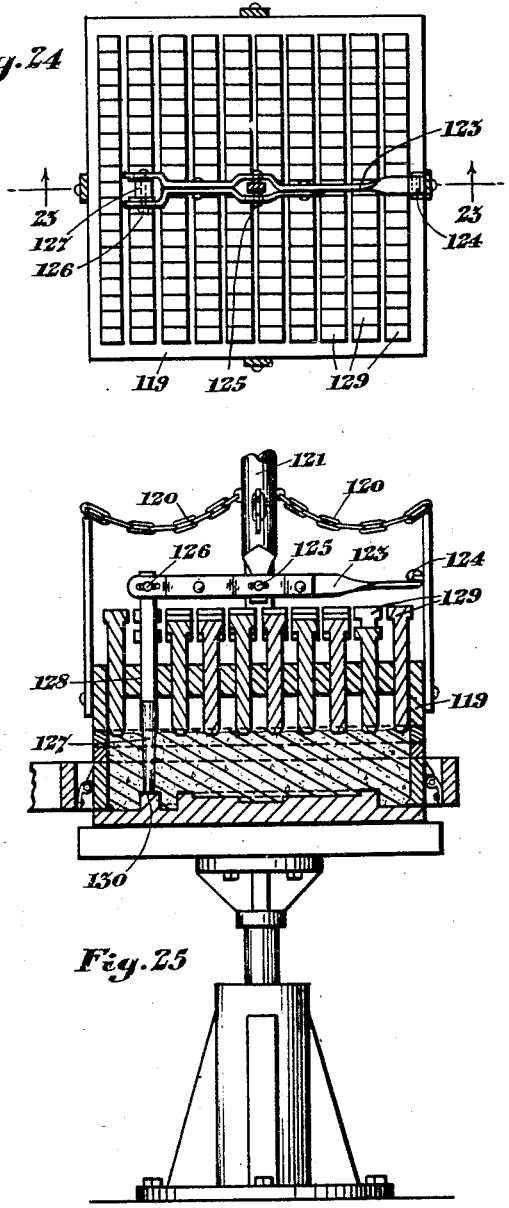
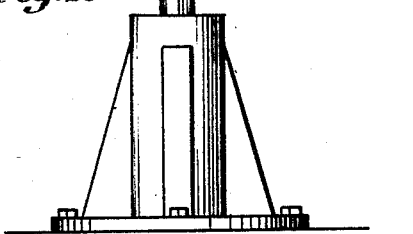

Patented July 27, 1943

2,325,501

UNITED STATES PATENT OFFICE 2,325,501

MOLDING MACHINE

Stanley J. Gedris, Grand Rapids, Mich.

Application January 30, 1942, Serial No. 428,912

22 Claims. (Cl. 22—20)

The present invention relates to molding machines, and more particularly to machines for making sand molds in which metal is to be cast, in foundries or the like.

The primary objects of the invention are, in general, to provide a semi-automatic molding machine which eliminates the manual performance of certain operations in making a sand mold; to provide such a machine which produces sand molds of uniform density thus insuring perfection in the metal casting made in the mold and eliminating "blisters" which occur in molds not uniformly packed; to provide such a machine having a novel presser head for eliminating manual ramming of sand in the cope and drag flasks in which the mold is made; to provide such a machine having co-operating flask supporting frames for automatically bringing together the cope and drag parts of the mold; to provide such a machine whose cope and drag flask supporting frames are each designed to carry a plurality of flasks, so that different operations may simultaneously be performed on each flask and the production rate of the completed molds thus greatly increased; to provide such a machine including transfer and conveyor means associated with said flask supporting frames for automatically transferring the completed molds from the frames to the foundry area in which the molten metal is poured into the molds for making the castings; to provide such a machine which accords certain other and more specific advantages hereinafter appearing; and to provide such a molding machine which is efficient in operation and reasonably economical in manufacture.

Illustrative embodiments of the invention are shown in the accompanying drawings, wherein:

Figure 1 is a side elevational view of the molding machine of the present invention;

Figure 2 is a top plan view thereof, certain parts of the machine being omitted in this view and certain other movable parts thereof being shown in different turned positions to better illustrate other parts of the machine beneath them;

Figure 3 is an enlarged fragmentary sectional view of parts thereof taken on line 3—3 of Figure 1;

Figure 4 is a sectional view of the same taken on line 4—4 of Figure 3;

Figure 5 is an enlarged sectional view of the drag presser head of the machine taken on line 5—5 of Figure 1;

Figure 6 is a sectional view of the same taken on line 6—6 of Figure 5;

Figure 7 is a sectional view of the same taken on line 7—7 of Figure 5;

Figure 8 is a perspective view of a packing block adapted for use in the presser heads of the machine;

Figure 9 is a perspective view of a pair of levelling frames which constitute part of the molding machine;

Figure 10 is an enlarged central vertical sectional view through the drag pattern table and presser head seen at the left of Figure 1, these parts being here shown in the drag mold-forming process;

Figure 11 is a sectional view similar to Figure 10 but showing the cope pattern table and presser head seen at the right of Figure 1;

Figure 12 is an enlarged fragmentary perspective view of a drag flask and its supporting frame, showing a portable mold-supporting slab applied to the drag flask;

Figure 13 is a top plan view of parts of the molding machine, similar to Figure 2 but showing certain movable parts thereof in different turned positions;

Figure 14 is a sectional view of parts thereof taken on line 14—14 of Figure 13;

Figure 15 is a side elevational view of parts of the molding machine, similar to Figure 1 but showing certain movable parts thereof in still other turned positions;

Figure 16 is an enlarged fragmentary central vertical sectional view of cope and drag flasks and the pneumatic transfer and conveyor seen in the center of Figures 1 and 15;

Figure 17 is an enlarged sectional view of certain parts of the machine taken on lines 17—17 of Figures 2 and 13;

Figure 18 is a fragmentary top plan view of the parts shown in section in Figure 17;

Figure 19 is a view similar to Figure 5 but showing a modified form of presser head;

Figure 20 is a sectional view thereof taken on line 20—20 of Figure 19;

Figure 21 is a perspective view similar to Figure 8 but showing a modified form of packing block;

Figure 22 is a fragmentary sectional view similar to Figure 11 but showing packing blocks of the modified type illustrated in Figure 21 applied to the cope presser head;

Figure 23 is a fragmentary view similar to Figure 11, shown partly in central vertical section taken on line 23—23 of Figure 24 and partly in side elevation, of another modification of the cope forming parts of the molding machine;

Figure 24 is a sectional view of the same taken on line 24—24 of Figure 23; and

Figure 25 is a fragmentary view similar to Figure 23 but showing certain parts of the machine in different positions.

Referring now in detail to these drawings wherein like parts are designated by the same numerals in the several views, the molding machine there illustrated generally comprises a drag flask supporting frame 1 whose central vertical hollow shaft 2 is pivotally and vertically slidably mounted on a column 3 set in the floor of the foundry, the hollow shaft 2 and column 3 being supported in upright position by means of a pedestal 4 secured by bolts 5 to the foundry floor; and a cope flask supporting frame 6 whose central vertical hollow shaft 7 is likewise pivotally and vertically slidably mounted on a column 8 set in the foundry floor and which hollow shaft 7 and column 8 are similarly supported in upright position by means of a pedestal 9 secured by bolts 10 to the foundry floor. The drag frame 1 is fixedly mounted on its central hollow shaft 2 by means of spider arms 11 whose inner ends are secured to the hollow shaft 2 by means of screws 12 and whose opposite pairs of outer ends are secured, respectively, to the side rails 13 of the frame 1 by means of bolts 14 and to the cross rails 15 of the frame 1 by means of bolts 16. In similar manner the cope frame 6 is fixedly mounted on its central hollow shaft 7 by means of spider arms 17 whose inner ends are secured to this hollow shaft 7 by means of screws 18 and whose opposite pairs of outer ends are secured, respectively, to the side rails 19 of the frame 6 by means of bolts 20 and to the cross rails 21 of the frame 6 by means of bolts 22.

Levers 23 and 24 are mounted on the pedestals 4 and 9 respectively for raising and lowering the drag frame 1 and the cope frame 6. These levers 23 and 24 being identical in construction and operation, only the drag lever 23 is shown in detail, in Figures 3 and 4 of the drawings. This lever 23 extends through a slot 25 in the pedestal 4 and is pivotally mounted on a spindle 26 passing through lugs 27 on opposite sides of the slot 25. The inner end of the lever 23 is forked and the prongs 28 thereof are pivotally attached by means of screws 29 to opposite sides of a collar 30 vertically slidably mounted on the column 3 below the hollow center shaft 2 of the drag frame 1. It will readily be seen that when the extreme outer end pedal 31 of the lever 23 is in a raised position the drag frame 1 is in a lowered position, and that when the pedal 32 is depressed and the lever 23 engaged beneath a keeper 33 secured to the foundry floor, the drag frame 1 is maintained in a raised position as illustrated in Figure 1 and remains free to revolve on the column 3.

A pivoted frame 34 is mounted in each end of the drag frame 1 and is horizontally pivotally secured in said frame 1 by means of the bolt 16 passing through the adjacent cross rail 15 of the drag frame 1 and a similar bolt 35 passing through the adjacent end rail 36 of the drag frame 1. Collars 37 are interposed between the pivoted frames 34 and their adjacent cross rails 15 and end rails 36, thus to properly space each pivoted frame 34 in the drag frame 1.

Drag flasks 38 are releasably secured in the pivoted frames 34 of the drag frame 1, and cope flasks 39 are similarly releasably secured in the opposite ends of the cope frame 6 as by means of a plurality of electrically controlled latch mechanisms. The cope latch mechanisms are generally designated 40, and one of these (indicated at the right end of the cope frame 6 in Figures 2 and 13) is illustrated in detail in Figures 17 and 18, and comprises a keeper 41 secured as by means of screws 42 to the outside of the cope flask 39 and a horizontally disposed cylindrical latch bolt 43 pivotally mounted on a spindle 44 extending between the spaced flanges 45 of a flexible metal armature 46 secured by a screw 47 to the adjacent end rail 48 of the cope frame 6. An electromagnet 49 is disposed in a cavity 50 in the end rail 48, and it will readily be seen that when the electromagnet 49 is energized, the armature 46 and latch bolt 43 are retracted from their normal positions shown in full lines in Figure 17 to their broken line positions shown in this figure, and the cope flasks 39 are thus released from the cope frame 6 when their supporting latch mechanisms 40 are simultaneously energized.

The electrically controlled latch mechanisms 51 at the sides of the drag flasks 38 are identical to those described above in connection with the cope flasks 39 except that the latch bolts, armatures, and electromagnets of these latch mechanisms 51 are installed in the pivoted frames 34 rather than in the drag frame 1 proper, while the end latch mechanisms 52 for these drag flasks 38 are identical to the side latch mechanisms 51 except that they are inverted, so that the drag flasks 38 are releasably secured in, and rotatable with, the pivoted frames 34.

When the drag frame 1 and cope frame 6 are in their positions shown in Figure 1, the outermost drag flask 38 is directly above the drag pattern 53 and the outermost cope flask 39 is directly above the cope pattern 54. The drag pattern 53 is mounted on a pattern table 55 secured by means of a bracket 56 and screws 57 to the upper end of the piston rod 58 of a pneumatic jolt rammer 59 of conventional construction secured to the foundry floor by means of screws 60 and having the usual cylinder 61, piston head 62, and fluid pressure conduit 63 (see Figure 10). In like manner, the cope pattern 54 is mounted on a pattern table 64 secured by means of a bracket 65 and screws 66 to the upper end of the piston rod 67 of a similar jolt rammer 68 secured to the foundry floor by means of screws 69 and having the usual cylinder 70, piston head 71, and fluid pressure conduit 72 (see Figure 11).

A drag presser head 73 is provided with a bail 74 whose four depending arms 75 are secured to this presser head by means of screws 76, and this drag presser head 73 is suspended directly above the drag pattern 53 by means of a cable 77 attached to the bail 74 and passing over a pulley 78 secured to a suitable mooring thereabove (not shown). In similar manner a cope presser head 79 is suspended directly above the cope pattern 54 by means of a cable 80 passing over a pulley 81 and attached to a bail 82 whose four depending arms 83 are secured to the cope presser head 79 by means of screws 84. These drag and cope presser heads may be raised or lowered by the operator by means of their cables, and the presser heads being identical in construction, only the drag presser head 73 is here shown in detail in Figures 5, 6, and 7.

The drag presser head 73 comprises an outer rectangular frame 85 and a plurality of horizontally spaced transverse cross bars 86 here shown formed integrally with the frame 85. The transverse slots 87 formed between the cross bars 86 are each adapted to receive a plurality of packing blocks 88 one of which blocks is shown in perspective view in Figure 8. These packing blocks 88 are of uniform thickness throughout but are widened at their top ends to form heads 89, are preferably beveled at their bottom ends 90, and are of various lengths and consequently vary in weight. As best illustrated in Figures 6 and 7, the longest and heaviest packing blocks are placed in the presser heads in positions corresponding to the deepest portions of the pattern, whereas the shortest and lightest packing blocks are placed to correspond to the highest portions of the pattern.

Operation

The machine is shown with its various parts in a starting position in Figure 1. The drag frame 1 is lowered by means of the lever 23 so that the outermost drag flask 38 rests on the drag pattern 53. At the same time, the cope frame 6 is lowered by means of the lever 24 so that the outermost cope flask 39 rests on the cope pattern 54. Over each of these flasks is next placed a pair of levelling frames 91 (see Figures 9, 10, and 11), and the flasks are then filled with sand. Next the drag presser head 73 and the cope presser head 79 are simultaneously lowered onto their flasks and frames 91, each packing block 89 striking the sand with a force directly proportionate to the ultimate finished thickness of the mold at that point. The blocks 88 being vertically slidable in the slots 87, their bottom ends 90 remain at substantially the same level in the sand. The beveled lower ends 90 of these packing blocks 88 facilitate adjustment of the sand to a substantially uniform upper level. The flasks are next disengaged from their supporting frames by energizing the electromagnetic latches 51 and 40, and the jolt rammers 59 and 68 are actuated to impart an intermittent up and down jolting of the tables 55 and 64 and to the drag and cope flasks now supported thereby. During this jolting operation, the packing blocks 88 continue to exert forces proportionate to the various thicknesses of the molds, and the sand is thus uniformly packed in the flasks.

Upon the completion of the jolting operation, the electromagnetic latches 51 and 40 are de-energized, thus restoring these outermost cope and drag flasks to the support of their respective frames, whereupon the presser heads 73 and 79 are raised, and the levelling frames 91 are slid off their respective flasks, first the upper levelling frames, and finally the lower levelling frames thus insuring surfaces on the tops of the molds which are smooth and level with the top edges of the flasks.

A portable mold-supporting slab 92 is next applied to the drag flask 38 containing the drag mold, as best seen in Figure 12. A pair of clamping members 93 is mounted on each side of the slab 92, said clamping members having lateral flanges 94 secured by screws 95 to the slab 92 and sloping flanges 96 adapted to engage pins 97 on the sides of the drag flask 38 to detachably secure the slab 92 to the drag flask after the slab has been slid into position thereon.

As illustrated in Figures 13 and 14, the cope and drag frames 1 and 6 respectively are now rotated through 180 degrees on their vertical axes during which rotation the pivoted frame 34—and the drag flask 38 and drag mold contained therein—is rotated 180 degrees on its horizontal axis to an inverted position. When the complementary cope and drag molds have thus been brought into their proper positions for assembly, with the cope mold above the inverted drag mold, the frames 1 and 6 are both lowered by means of the levers 23 and 24 and the flasks and molds are united as illustrated in Figures 15 and 16.

A pneumatic transfer 98 secured to the foundry floor by means of screws 99, is of conventional construction having a cylinder 100, fluid pressure conduit 101, piston head 102, and piston rod 103 carrying a platform 104 on the upper end thereof, is now actuated so that the platform is raised into contact with the slab 92. The electro-magnetic latches 40 and 52 are now energized and the united cope and drag flasks are released from their supporting frames. The transfer platform 104 is now lowered (see Figure 16) and the slab 92, the united cope and drag flasks, and the completed mold therein are deposited on a horizontal conveyor comprising spaced apart tracks 105 mounted upon posts 106 secured to the foundry floor by means of screws 107 and having conveyor chains 108 movable in the tracks 105 and provided with lugs 109 to engage the slab 92.

It will be seen that the rotation of the drag and cope frames through 180 degrees and subsequent lowering thereof previously described, brings the now outermost cope and drag flasks into position on the patterns 54 and 53 respectively for forming another mold, and that release of these now outermost cope and drag flasks for the jolting operation coincides with the release of the already completed mold to the transfer platform 104, and thus the electromagnetic latches may be operated simultaneously.

New flasks are inserted into the frames after each completed mold is removed by the transfer. If desired, the cope and drag frames may be so constructed as to carry four flasks each, spaced 90 degrees apart, thus further speeding up the operation.

The sprue through which molten metal is poured into the finished mold and which connects with the gate 110 of the mold may be made manually where indicated by the dotted lines at 111 in Figure 16.

Modifications

Figures 19 and 20 disclose a modified type of packing blocks 112 fitted into the slots 113 of the presser head 114. These blocks 112 extend the entire length of the slots and have their lower or packing edges cut away to correspond roughly to the form of the pattern 115. Thus during the jolting operation the packing is substantially uniform throughout the mold.

It is sometimes found desirable to form minute passages through the cope mold to permit escape of gases which may collect within the mold during the pouring operation. Figures 21 and 22 illustrate a modified type of packing blocks 116 each having needle-like projections 117 on their bottom ends for forming the desired passages when the presser head 118 is lowered onto the sand. These needle-like projections do not necessarily penetrate through to the pattern, but only near enough to weaken the mold at these points sufficiently for the gases to force a complete passage.

The modified form of the invention shown in Figures 23, 24, and 25 shows, in conjunction with a cope presser head 119 similar to those previously described, mechanism for automatically cutting the sprue through which the molten metal is to be poured. In this construction, the presser head 119 is suspended as by means of chains 120 from the piston rod 121 of a pneumatic cylinder 122. A lever arm 123 is pivotally connected to the presser head 119 as at 124, and said lever arm 123 has, at its middle, a pin and slot connection 125 with the lowermost end of the piston rod 121, and at its free end a pin and slot connection 126 with a sprue-cutter 127 which extends through one of the slots 128 in the presser head 119. Initial downward movement of piston rod 121 lowers the presser head 119 and the packing blocks 129 pack the sand as indicated in Figure 23. Farther downward movement of the piston rod 121 relaxes the chains 120 and forces the sprue-cutter 127 through the mold to the gate 130 thereof, as indicated in Figure 25.

It will thus be seen that the present invention provides a semi-automatic mold machine which is particularly adapted to geared-up production, which produces molds of excellent quality, and which is simple and rugged in construction and efficient in use; and while but several specific embodiments of the invention have been herein shown and described, it will be understood that numerous details thereof may be altered or omitted without departing from the spirit of the invention as the same is defined by the following claims.

I claim:

1. In a molding machine, a drag flask supporting frame mounted for pivotal movement about a vertical axis, a drag flask releasably mounted in said drag flask supporting frame for movement about a horizontal axis to invert the flask, a drag pattern table, a drag presser head above the drag pattern table adapted to pack sand in the drag flask when the drag supporting frame is rotated to position the drag flask on the drag pattern, a cope flask supporting frame mounted for pivotal movement about a vertical axis, a cope flask releasably mounted in said cope flask supporting frame, a cope pattern table, and a cope presser head above the cope pattern table adapted to pack sand in the cope flask when the cope supporting frame is rotated to position the cope flask on the cope pattern, said drag and cope flask supporting frames being rotatable to superimposed positions wherein the cope flask may be united with the inverted drag flask.

2. In a molding machine, a drag flask supporting frame mounted for pivotal movement about a vertical axis, a drag flask releasably mounted in said drag flask supporting frame for movement about a horizontal axis to invert the flask, a drag pattern table, a drag presser head above the drag pattern table adapted to pack sand in the drag flask when the drag supporting frame is rotated to position the drag flask on the drag pattern, a cope flask supporting frame mounted for pivotal movement about a vertical axis, a cope flask releasably mounted in said cope flask supporting frame, a cope pattern table, a cope presser head above the cope pattern table adapted to pack sand in the cope flask when the cope supporting frame is rotated to position the cope flask on the cope pattern, said drag and cope flask supporting frames being rotatable to superimposed positions wherein the cope flask may be united with the inverted drag flask, and a vertically movable transfer adapted to receive the united drag and cope flasks upon their release from their respective frames.

3. In a molding machine, a drag flask supporting frame mounted for pivotal movement about a vertical axis, a drag flask releasably mounted in said drag flask supporting frame for movement about a horizontal axis to invert the flask, a drag pattern table, a drag presser head above the drag pattern table adapted to pack sand in the drag flask when the drag supporting frame is rotated to position the drag flask on the drag pattern, a cope flask supporting frame mounted for pivotal movement about a vertical axis, a cope flask releasably mounted in said cope flask supporting frame, a cope pattern table, a cope presser head above the cope pattern table adapted to pack sand in the cope flask when the cope supporting frame is rotated to position the cope flask on the cope pattern, said drag and cope flask supporting frames being rotatable to superimposed positions wherein the cope flask may be united with the inverted drag flask, a horizontal conveyor passing beneath the united drag and cope flasks, and a vertically movable transfer adapted to transfer the united cope and drag flasks to said horizontal conveyor.

4. In a molding machine, a drag flask supporting frame mounted for pivotal movement about a central vertical axis, a pair of drag flasks releasably mounted in the opposite ends of said drag flask supporting frame for movement about horizontal axes to invert the flasks, a drag pattern table, a drag presser head above the drag pattern table adapted to pack sand in one of the drag flasks when the drag supporting frame is rotated to position said drag flask on the drag pattern, a cope flask supporting frame mounted for pivotal movement about a central vertical axis, a pair of cope flasks releasably mounted in the opposite ends of said cope flask supporting frame, a cope pattern table, and a cope presser head above the cope pattern table adapted to pack sand in one of the cope flasks when the cope supporting frame is rotated to position said cope flask on the cope pattern, said drag and cope flask supporting frames being rotatable to superimposed positions wherein the cope flask and its mold may be united with the inverted drag flask and its mold, in which position the empty opposite drag flask is positioned on the drag pattern and the empty opposite cope flask is positioned on the cope pattern.

5. In a molding machine, a drag flask supporting frame mounted for pivotal movement about a central vertical axis, a pair of drag flasks releasably mounted in the opposite ends of said drag flask supporting frame for movement about horizontal axes to invert the flasks, a drag pattern table, a drag presser head above the drag pattern table adapted to pack sand in one of the drag flasks when the drag supporting frame is rotated to position said drag flask on the drag pattern, a cope flask supporting frame mounted for pivotal movement about a central vertical axis, a pair of cope flasks releasably mounted in the opposite ends of said cope flask supporting frame, a cope pattern table, a cope presser head above the cope pattern table adapted to pack sand in one of the cope flasks when the cope supporting frame is rotated to position said cope flask on the cope pattern, said drag and cope flask supporting frames being rotatable to superimposed positions wherein the cope flask and its mold may be united with the inverted drag flask and its mold, in which position the empty opposite drag flask is positioned on the drag pattern and the empty opposite cope flask is positioned on the cope pattern, and a vertically movable transfer adapted to receive the united drag and cope flasks upon their release from their respective frames.

6. In a molding machine, a drag flask supporting frame mounted for pivotal movement about a central vertical axis, a pair of drag flasks releasably mounted in the opposite ends of said drag flask supporting frame for movement about horizontal axes to invert the flasks, a drag pattern table, a drag presser head above the drag pattern table adapted to pack sand in one of the drag flasks when the drag supporting frame is rotated to position said drag flask on the drag pattern, a cope flask supporting frame mounted for pivotal movement about a central vertical axis, a pair of cope flasks releasably mounted in the opposite ends of said cope flask supporting frame, a cope pattern table, a cope presser head above the cope pattern table adapted to pack sand in one of the cope flasks when the cope supporting frame is rotated to position said cope flask on the cope pattern, said drag and cope flask supporting frames being rotatable to superimposed positions wherein the cope flask and its mold may be united with the inverted drag flask and its mold, in which position the empty opposite drag flask is positioned on the drag pattern and the empty opposite cope flask is positioned on the cope pattern, a horizontal conveyor passing beneath the united cope and drag flasks, and a vertically movable transfer adapted to transfer the united cope and drag flasks to said horizontal conveyor.

7. In a molding machine, in combination with a pattern including a gate portion, and a flask on said pattern for containing sand, a presser head adapted to be lowered onto the flask and having a plurality of slots therethrough, a plurality of packing blocks vertically slidably disposed in said slots and adapted to pack the sand in the flask, a lever arm having one end thereof pivotally attached to the presser head, a sprue-cutter pivotally attached to the free end of said lever arm, and a pneumatic cylinder having a piston rod flexibly connected to the presser head and pivotally connected to the lever arm intermediate the latter's ends whereby initial downward movement of the piston rod lowers the presser head onto the flask and farther downward movement of the piston rod forces said sprue-cutter through the sand in the flask to the gate portion of said pattern.

8. In a molding machine, in combination with a pattern and a flask thereon for containing sand, a pressure head located above said pattern and flask, a plurality of packing blocks mounted for vertical sliding movement on said frame, a sprue-cutter mounted for vertical movement on said frame and means for forcibly moving said sprue-cutter downwardly through said sand into proximity with said pattern.

9. In a molding machine, in combination with a pattern and a flask thereon for containing sand, a pressure head located over the pattern and flask and comprising a frame having a plurality of spaced vertical openings therethrough, a plurality of packing blocks vertically slidable and guided in said openings, means to limit the downward movement of said blocks relative to said frame, the dimensions of the lower portions of said blocks being no greater than the corresponding dimensions of said openings whereby said blocks may be readily removed from said openings by lifting upwardly.

10. The elements in combination defined in claim 9 wherein said blocks are of different lengths and are interchangeably receivable in said openings.

11. The elements in combination defined in claim 9 wherein said blocks are of different weights and are interchangeably receivable in said openings.

12. The elements in combination defined in claim 9 wherein said blocks are of different lengths and of different weights and are interchangeably receivable in said openings.

13. In a molding machine, a drag flask supporting frame and a cope flask supporting frame, each mounted for rotation on a vertical axis from respective separated molding positions to a common superimposed flask joining position and means for detachably mounting drag and cope flask portions respectively in each frame.

14. The elements in combination defined in claim 13 in which the means for mounting the drag flask portion in the drag flask supporting frame includes means for rotating the drag flask in said frame on a horizontal axis.

15. The elements in combination defined in claim 13 combined with means for elevating each of said supporting frames on its vertical axis.

16. The elements in combination defined in claim 13 combined with a horizontal conveyor adjacent said common flask joining position and means for transferring the joined flask portions from said supporting frames to said conveyor.

17. The elements in combination defined in claim 13 in which the vertical axes of the respective flask supporting frames are separate and spaced apart and each flask supporting frame includes means for detachably mounting a plurality of flask portions.

18. The elements in combination defined in claim 13 in which the horizontal plane of rotation of said cope flask supporting frame is located above the corresponding plane of the drag flask supporting frame.

19. The elements in combination defined in claim 13 in which said means for detachably mounting said drag and cope flask portions are electrically operated latches.

20. The elements in combination defined in claim 13 combined with a pattern table at each of said molding positions, and means for elevating each of said flask supporting frames on its vertical axis above the patterns on the respective pattern tables.

21. The elements in combination defined in claim 13 combined with a support located beneath said flask supporting frames at said flask joining positions to receive said flasks when they are detached from said frames.

22. The elements in combination defined in claim 13 combined with a conveyor and a support located beneath said flask supporting frames at said flask joining positions to receive said flasks when they are detached from said frames, said support being movable from said flask receiving position to deposit said flask upon said conveyor.

STANLEY J. GEDRIS.